UNITED STATES PATENT OFFICE.

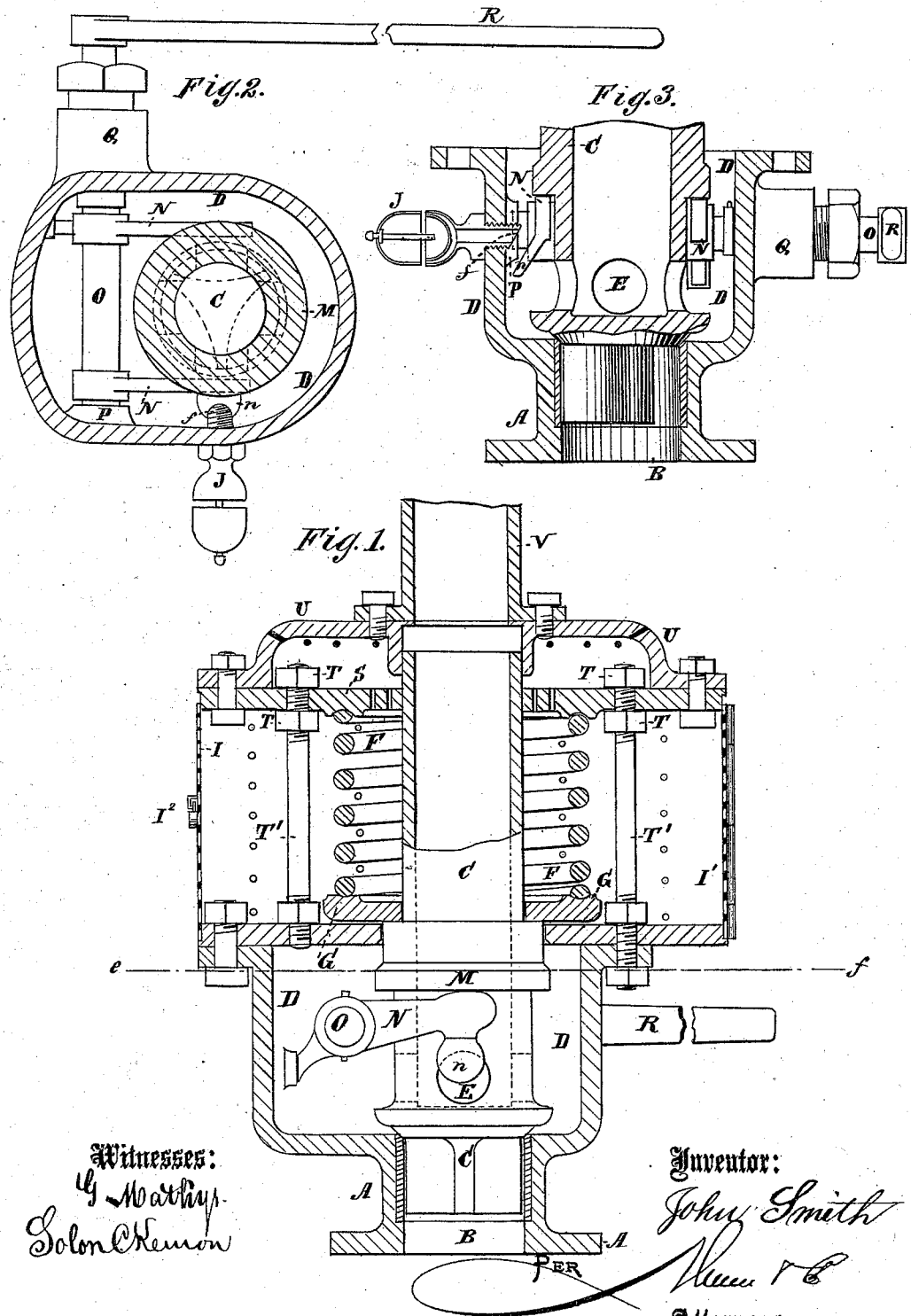

JOHN SMITH, OF OLD FORD, ENGLAND.

IMPROVEMENT IN COMBINED INDICATORS AND SAFETY-VALVES.

Specification forming part of Letters Patent No. 143,644, dated October 14, 1873; application filed February 11, 1873.

*To all whom it may concern:*

Be it known that I, JOHN SMITH, of Old Ford, in the county of Middlesex, England, have invented a new Improvement in Combined Indicator and Safety-Valve for Steam-Boilers, and for other purposes; and I do hereby declare the following to be a full, clear, and exact description of the same, reference being had to the accompanying drawing forming part of this specification.

The invention consists in the improvement of valves, as hereinafter described, and subsequently pointed out in the claims.

Figure 1 is a vertical elevation, partly in section. Fig. 2 is a horizontal section of Fig. 1 through the line *e f.* Fig. 3 is a vertical sectional elevation of that portion of Fig. 1 not shown in section.

C is a valve-spindle, provided with a ring-shoulder, M, which is acted against on its under side by two levers, N, attached to a horizontal spindle, O, one end of which is supported in a bearing, P, the other passing through a stuffing-box, Q, and having attached to its extremity a lever, R. Thus, by raising the lever R, the short levers N will be brought to act against the under surface of the shoulder M, thus raising the hollow spindle or plug C, and allowing the steam to pass up the same and escape. The whistle J is fixed in the side of the chamber D, and so arranged that it will be sounded only when the spindle C is raised by an excess of pressure of steam within the boiler, and not when it is raised by the lever R to let off the steam; as, if allowed to sound in the latter case, it would prove of great inconvenience and be of no service. For this purpose the whistle is so placed in relation to one of the short levers N that the said lever N is raised by the action of the lever R, so as to cover over the valve-seat *j* at the inner end of the tube leading to whistle with a valve, *n*, and thus prevent it from being sounded. An arrangement is also provided for setting up or slackening the spring F by raising or lowering the plate or disk S, which also forms the top of the surrounding casing I. This is effected by supporting the said plate S between nuts T, which are screwed onto bolts T', so that by raising or lowering the said nut the plate S may be raised or lowered, as required. Those of the said nuts T which are above the plate S are inclosed by the cover U, so that they cannot be tampered with when once set, and those of the nuts T which are below the plate S, as also the bolts themselves and the spring, are completely inclosed by the surrounding casing I, which, in this case, is made of two pieces hinged together, as at $I^1$, and fastened, when in position and closed, by a lock, as at $I^2$. The spring F is made considerably larger than the spindle C, which it surrounds, and the object of this is that the spring may not get overheated during the passage of the steam up the spindle C; and, to further this object, the surrounding casing I, plate S, and cover U are perforated, so as to allow of the circulation of air therethrough. V is the waste-steam pipe, which is bolted on the cover U.

Having thus described my invention, what I claim as new, and desire to secure by Letters Patent, is—

1. The perforated cover U, plate S', and lock-case I, arranged in connection with the bolts and nuts, and with respect to the spindle and spring, as described, so that the air may circulate freely in contact with the spring and deprive it of its caloric, while no essential part can be tampered with.

2. The lever N, having the valve *n*, in combination with the valve-spindle C and the seat *j* of a whistle, substantially as and for the purpose described.

The above specification of my invention signed by me this 21st day of December, 1872.

JOHN SMITH.

Witnesses:
 JOHN WM. GRAY,
 E. SEARLE.